United States Patent [19]
Chikamori et al.

[11] Patent Number: 5,700,115
[45] Date of Patent: Dec. 23, 1997

[54] SPEED-INCREASING SPINDLE DEVICE

[75] Inventors: Akira Chikamori, Kitakatsuragi-gun; Shinji Yasuhara, Kashiwara, both of Japan

[73] Assignees: Koyo Machine Industries Co., Ltd.; Koyo Seiko Co., Ltd., both of Osaka, Japan

[21] Appl. No.: 594,849

[22] Filed: Jan. 31, 1996

[30] Foreign Application Priority Data

Feb. 7, 1995 [JP] Japan ................... 7-043547
Jan. 18, 1996 [JP] Japan ................... 8-024969

[51] Int. Cl.$^6$ ................................................. B23C 9/00
[52] U.S. Cl. ................... 408/126; 408/233; 408/238; 279/8
[58] Field of Search ................... 408/126, 233, 408/238, 239 A, 231; 279/8; 409/230

[56] References Cited

U.S. PATENT DOCUMENTS

| | | | |
|---|---|---|---|
| 2,369,273 | 2/1945 | Bakewell | 408/233 X |
| 2,924,152 | 2/1960 | Zettler | 408/239 A X |
| 4,960,405 | 10/1990 | Katayama et al. | |
| 4,981,403 | 1/1991 | Katayama | 408/126 X |
| 5,026,224 | 6/1991 | Andersson et al. | 279/8 X |
| 5,033,921 | 7/1991 | Yasuhara et al. | |
| 5,295,772 | 3/1994 | Ueda et al. | 408/126 X |

FOREIGN PATENT DOCUMENTS

| | | | |
|---|---|---|---|
| 3314591 | 10/1984 | Germany | 279/8 |
| 609607 | 4/1959 | Italy | 279/8 |

Primary Examiner—Daniel W. Howell
Assistant Examiner—Henry W. H. Tsai
Attorney, Agent, or Firm—Nikaido, Marmelstein, Murray & Oram LLP

[57] ABSTRACT

A speed-increasing spindle device in an assembly structure in a separable form of device main body and shank, capable of using a coupling bolt of large diameter, high in rigidity, and sufficient in strength. The head of the coupling bolt is rotatably engaged in a bolt head engaging part provided at one side of the device main body and shank, while the threaded part of the coupling bolt is engaged with a screw hole provided at the other side of the device main body and shank, and the engaging part for rotary operation tool provided on the outer end plane in the axial direction of the coupling bolt confronts outside through the insertion hole of the shank. The bolt head engaging part has a bolt head accommodating space larger than the maximum hole diameter permitted in the shank in terms of strength, and therefore the shaft diameter of the coupling bolt may be set, at least, as large as the maximum hole diameter of the shank.

16 Claims, 8 Drawing Sheets

SPEED-INCREASING SPINDLE DEVICE

BACKGROUND OF THE INVENTION

1. Field of the Invention

The present invention relates to a speed-increasing spindle device detachably mounted on a main shaft of a variety of machine tools, and more particularly to an assembly structure of shank and device main body, in a speed-increasing spindle device incorporating a planet speed-increasing mechanism such as traction drive mechanism.

2. Description of the Related Art

This kind of speed-increasing spindle device has a function of increasing the rotating speed at the input side by several times and transmitting to the output side, by incorporating a planet speed-increasing mechanism such as planet roller mechanism (so-called traction drive mechanism) and planet gear mechanism, and recently it is widely used in various machine tools such as machining center (MC) in which high speed rotation is particularly demanded from the viewpoint of enhancement of production efficiency and the like.

In particular, the speed-increasing spindle device for machining center has been hitherto proposed in various structures, in the form of tool adapter detachably mounted on the main shaft of the machine tool by automatic tool changer (ATC), same as in the ordinary tool for MC.

For example, the speed-increasing spindle device disclosed in Japanese Laid-open Patent No. 5-245738 is structured as shown in FIG. 8, in which a device main body (b) incorporating a traction drive mechanism (a) as planet speed-increasing mechanism and a shank (c) detachably mounted on the main shaft of the machine tool are integrally coupled in the axial direction. The device main body (b) comprises an input shaft (e) integrally coupled with the shank (c) and a high speed output shaft (g) having a tool mounting part (f) at the front end thereof, being coaxially and rotatably supported inside a hollow housing (d), and both these shafts (e), (g) are driven and coupled by the traction drive mechanism (a).

The device main body (b) and the shank (c) are assembled and coupled separably in the axial direction, by a coupling bolt (h), and hence different types of device main body (b) and shank (c) can be properly combined and used.

In this conventional assembly structure, as shown in the drawing, a screw hole (i) is provided in the input shaft (e) of the device main body (b), and a threaded part (k) of the coupling bolt (h) inserted into an insertion hole (j) of the shank (c) is screwed and fitted in this screw hole (i). By tightening the coupling bolt (h), the head (l) of the coupling bolt (h) is engaged with a stopping shoulder (m) of the insertion hole (j), so that the device main body (b) and shank (c) are tightened and fixed from both sides.

In such assembly structure, however, as mentioned below, the outside diameter of the shaft of the coupling bolt (h) cannot be made so large, and the strength is insufficient, and it is not usable practically.

That is, the inside diameter of the insertion hole (j) of the shank (c) is set depending on the head (l) of the coupling bolt (h), and therefore when this inside diameter is increased, the wall thickness of the shank (c) becomes relatively thin, in relation to the outside diameter of the shank (c). However, the wall thickness of the shank (c) must be kept larger than a specific dimension in order to maintain the strength, and the inside diameter of the insertion hole (j) cannot be set too large owing to this limitation. At the base end or rear end of the shank (c), a screw hole (n) is provided for fitting a pull stud bolt (for example, JIS (Japanese Industrial Standard) product) used for mounting the shank (c) on the main shaft of the machine tool. Accordingly, it is a structural definition that the outside diameter of the head (l) of the coupling bolt (h) cannot be set larger than the inside diameter of the screw hole (n).

Hence, there is a limit in the outside diameter of the head (l) of the coupling bolt (h), and the shaft including the threaded part (k), and large-diameter coupling bolt (h) cannot be used. As a result, the coupling force by the coupling bolt (h) is insufficient, and the rigidity of the coupling portion is weak as tool adapter, and the strength is insufficient, and it is not usable practically.

BRIEF SUMMARY OF THE INVENTION

It is hence a primary object of the invention to present a novel speed-increasing spindle device eliminating the above conventional problems.

It is other object of the invention to present a speed-increasing spindle device capable of using a large-diameter coupling bolt, high in rigidity, and having a sufficiently strong assembly structure.

It is a different object of the invention to present a speed-increasing spindle device capable of further enhancing the rigidity and strength of the coupling part, by the synergistic effect with the high rigidity of the coupling bolt, in a two-plane restraint structure of junction of the base end portion of the input shaft of the device main body and the front end portion of the shank.

It is a further different object of the invention to present a speed-increasing spindle device comprising a negative pressure preventive structure for communicating the inside of the device main body with the atmosphere so as to prevent suction of external coolant liquid into the device main body, if the device is rotated and driven at high speed, without setting the inside of the main body in negative pressure state.

To achieve the objects, the invention provides a speed-increasing spindle device comprising a device main body incorporating a planet speed-increasing mechanism such as traction drive mechanism, and a shank detachably mounted on a main shaft of a machine tool, being assembled and coupled separably in the axial direction by coupling bolt means, wherein this coupling bolt means is composed of a coupling bolt, a bolt head engaging part provided at one side of the device main body and shank, with the head of the coupling bolt engaged in the axial direction, and a screw hole provided at other side of the device main body and shank, with the coupling bolt screwed and engaged, the bolt head engaging part possesses a bolt head accommodating space larger than the maximum hole diameter permitted in the shank in terms of strength, the coupling bolt has an engaging part for rotary operation tool at its outer end in the axial direction, and the engaging part is opposite to the outside at the base end side of the shank through an insertion hole provided in the shank.

In a preferred mode, the coupling bolt has its head portion rotatably engaged with the bolt head engaging part provided in the base end portion of the input shaft of the device main body, and its threaded part is screwed into the screw hole provided along the axial center of the shank, the engaging part for the rotary operation tool is provided in the screw part end surface of the coupling bolt, and the bolt head engaging part comprises a bolt head accommodating space of at least larger diameter than the insertion hole of the shank, a bolt insertion hole communicating with the base end side of the input shaft from this accommodating space, and a coupling support part for engaging and supporting the head of the coupling bolt in the axial direction, being provided in the boundary area of the accommodating space and insertion hole.

In other preferred mode, the coupling bolt has its head rotatably engaged with the bolt head engaging part provided in the front end portion of the shank, and its threaded portion is screwed into the screw hole provided along the axial center of the device main body, the engaging part for the rotary operation tool is provided in the head end surface of the coupling bolt, and the bolt head engaging part opens to the front end side of the shank, and comprises a bolt head accommodating space of at least larger diameter than the insertion hole of the shank and a coupling support part for engaging and supporting the head of the coupling bolt in the axial direction, being provided in the accommodating space.

When assembling or disassembling the speed-increasing spindle device of the invention, a rotary operation tool, for example, a hexagon wrench or the like is inserted from the base end side of the shank through the insertion hole, and is engaged with the engaging part of the coupling bolt, and the coupling bolt is rotated and operated.

In such assembly structure, the bolt head engaging part has the bolt head accommodating space larger than the maximum hole diameter permitted in the shank in terms of strength, and hence the head outside diameter of the coupling bolt is not limited by the maximum hole diameter of the shank, and can be set, for example, larger than the screw hole for pull stud bolt provided in the base end portion of the shank. As a result, the shaft diameter of the coupling bolt can be increased, at least, nearly equal to the maximum hole diameter permitted in the shank in terms of strength, so that the rigidity and strength of the coupling part by the coupling bolt can be enhanced.

Herein, "the maximum hole diameter permitted in the shank in terms of strength" refers to the maximum allowable inside diameter of a right cylindrical hole penetrated into both ends of the shaft along the axial center of the shank, and means the same hereinafter throughout this specification.

Other objects and features of the invention will be better understood and appreciated from the following detailed description taken in conjunction with the accompanying drawings and novel facts disclosed in the claims.

BRIEF DESCRIPTION OF THE DRAWINGS

FIG. 5 is a diagram showing essential parts of the assembly structure of the speed-increasing spindle device, in which

FIG. 7 is a diagram showing essential parts of the assembly structure of the speed-increasing spindle device, in which

DETAILED DESCRIPTION OF THE PREFERRED EMBODIMENTS

Figure 1:
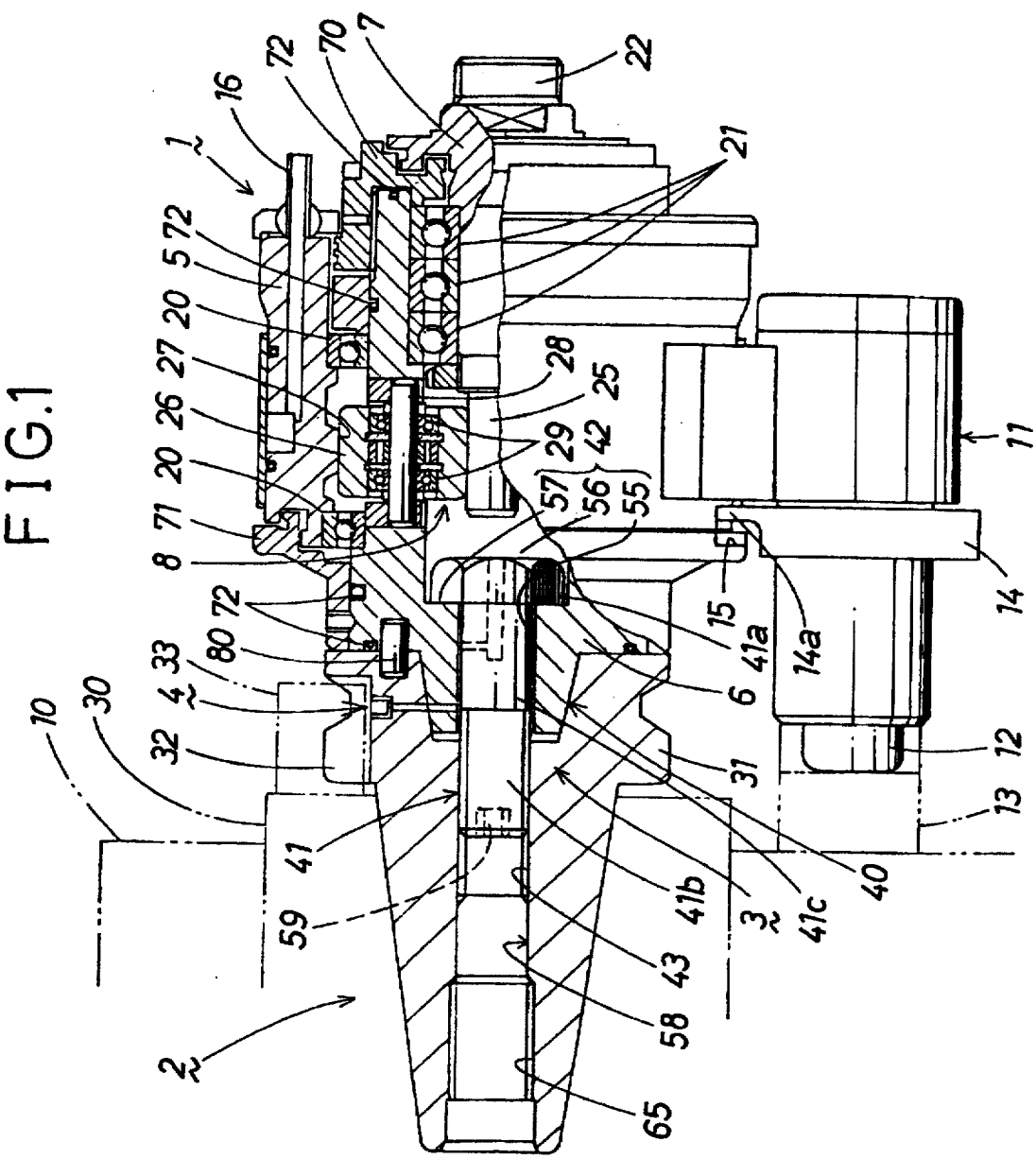
FIG. 1 is a partially cut-away side view of a speed-increasing spindle device in embodiment 1 of the invention.

Referring now to the drawings, some of the preferred embodiments of the invention are described in detail below.

FIG. 1 through FIG. 7 show speed-increasing spindle devices according to the invention, and same reference numerals refer to same or similar constituent members or elements throughout the drawings.

Embodiment 1

Figure 2:
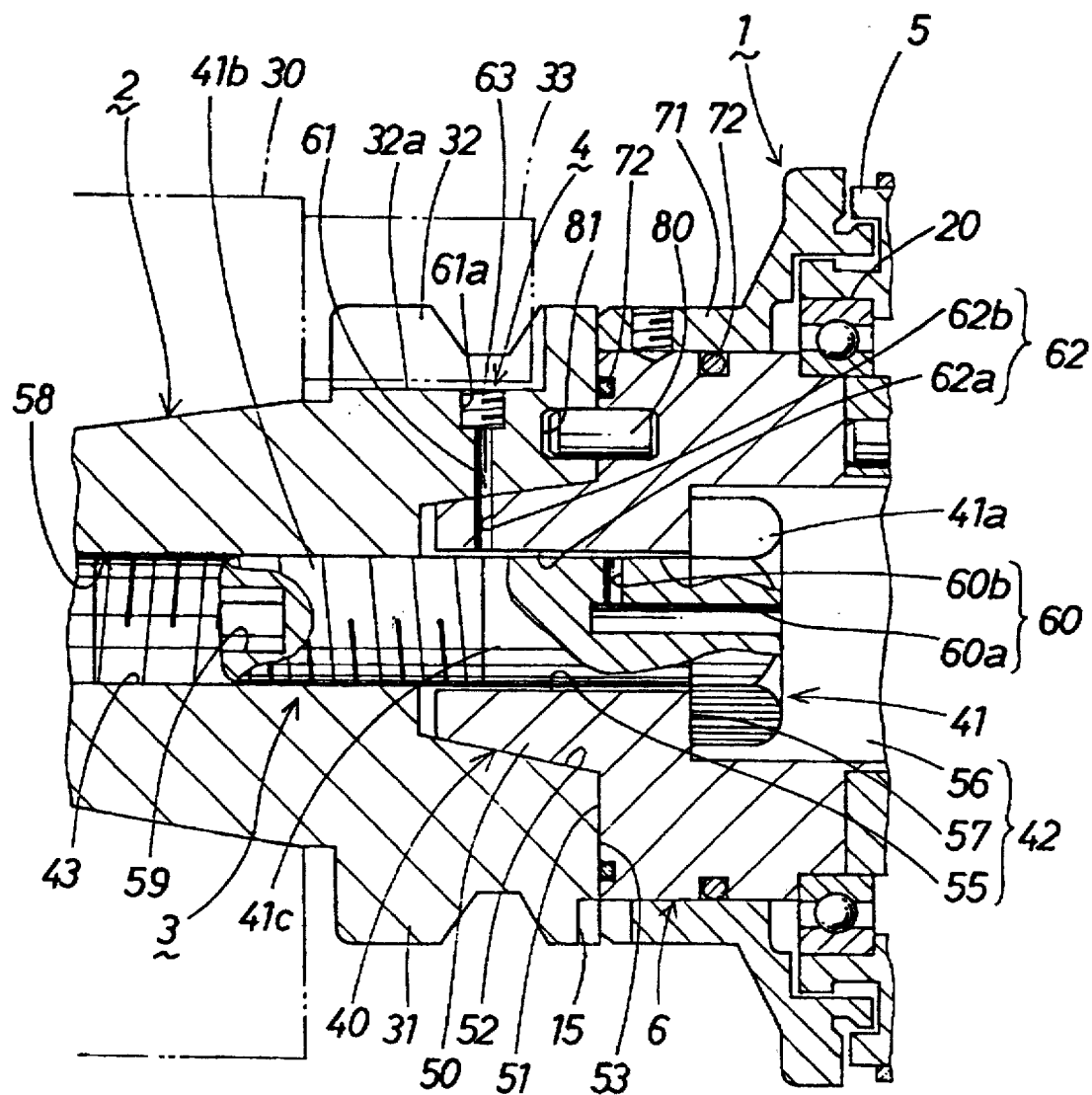
FIG. 2 is a side sectional view showing an assembly structure of device main body and shank for composing essential parts of the speed-increasing spindle device.

An embodiment of the speed-increasing spindle device of the invention is shown in FIG. 1 and FIG. 2. This speed-increasing spindle device is, specifically, a form of MC tool adapter detachably mounted on a machining center (MC). This speed-increasing spindle device comprises a device main body 1, a shank 2, and coupling bolt means 3 in an assembly structure for assembling and coupling these parts 1, 2 separably in the axial direction, and also contains negative pressure preventive means 4 for preventing a coolant liquid from invading into the device main body 1 from outside. Each constituent component is described below.

A. Device main body 1

The device main body 1 has an input shaft 6 at driving side, a high speed output shaft 7 as driven side, and a traction drive mechanism 8 as planet speed-increasing mechanism for driving and coupling between both shafts 6, 7, provided as essential parts in a hollow housing 5.

The hollow housing 5 is nearly cylindrical, and has locking means 11 for a machine main body 10 of the machining center. This locking means 11 is extended nearly parallel to the axial line of the hollow housing 5, on the outer circumference of the hollow housing 5. As known hitherto, a locking pin 12 of the locking means 11 can be engaged with a locking block 13 of the machine main body 10. On the outer circumference of the locking pin 12, a sliding element 14 is externally fitted slidably in the axial direction, and a detent pawl 14a of the sliding element 14 can be engaged and disengaged in a detent groove 15 in the shank 2. Although not shown in the drawing, a coolant feed passage communicating with a spray nozzle 16 of the hollow housing 5 is provided in the locking pin 12. This coolant feed passage can communicate with the coolant feed source, not shown, through the locking block 13 of the machine main body 10.

The input shaft 6 is a hollow cylinder opened at the front end side, and is rotatably supported in the hollow housing 5 through bearings 20, 20, and its middle part in the axial direction is driven and coupled with the high speed output shaft 7 through the traction drive mechanism 8, and its base end portion is integrally coupled coaxially with the shank 2 through the coupling bolt means 3 as described later.

The high speed output shaft 7 is rotatably supported in the hollow housing 5. Specifically, the high speed output shaft 7 is rotatably supported coaxially with the input shaft 6, by means of bearings 21, 21, 21, in the front end cylindrical space of the input shaft 6. The base end portion, that is, the rear end portion of the high speed output shaft 7 is driven and coupled to the input shaft 6 through the planet speed-increasing mechanism 8, and a tool mounting part 22 is provided at its front end portion. In this tool mounting part 22, although not shown, end mill, drill and other rotary tools are detachably and exchangeably mounted.

The traction drive mechanism 8 increases the rotating speed of the input shaft 6, and drives and transmits to the high speed output shaft 7. This mechanism 8 is interposed between the input shaft 6 and high speed output shaft 7, and more specifically it is composed of principal parts, that is, sun roller 25, a plurality of (for example, three) planet rollers 26, 26, . . . , and an annular static track 27.

The sun roller 25 is composed of cylindrical outer circumference of the base end position of the output shaft 7, and the planet rollers 26, 26 . . . roll on the sun roller 25. These planet rollers 26, 26 . . . are elastic rollers, and are disposed at equal intervals on a support shaft 28 provided in the middle part in the axial direction of the input shaft 6 rotatably through bearings 29, 29. The annular static track 27 is composed of an inner circumference of the hollow housing 5, and rolls and guides the planet rollers 26, 26, . . . at its inside.

These constituent elements are disposed so as to transmit friction, and the traction drive mechanism 8 is composed. As a result, when the input shaft 6 is rotated and driven integrally with the shank 2, the planet rollers 26 roll by friction on the annular static track 27, and rotate while revolving, and the torque by this rotation is frictionally transmitted to the sun roller 25. Consequently, the output shaft 7 is rotated and driven at a rotating speed increased multiple times than the input shaft 6. In this case, the speed increasing ratio may be properly set, depending on the purpose, by adjusting the diameter ratio and others among constituent elements of the traction drive mechanism 8.

B. Shank 2

The shank 2 composes the mounting part of the speed-increasing spindle device, and is specifically in a form of taper shank. The shank 2 is detachably mounted on a main shaft 30 of the machine main body 10 of the machining center, and its front end is, as mentioned above, coaxially coupled integrally with the input shaft 6 of the device main body 1 through the coupling bolt means 3.

A flange 31 is provided on the outer circumference of the front end portion of the shank 2, and it is engaged with a gripping arm of an automatic tool changer (ATC) not shown. A key groove 32 is formed in part of the flange 31 in the circumferential direction. With the shank 2 mounted on the main shaft 30, a drive key 33 of the main shaft 30 is engaged with the key groove 32, and the shank 2 is positioned in the circumferential direction relative to the main shaft 30. At the front end outer peripheral edge of the shank 2, the detent groove 15 is provided as mentioned above. Before mounting of the speed-increasing spindle device, the detent pawl 14a of the sliding element 14 is engaged with the detent groove 15, and the shank 2 and the hollow housing 5 of the device main body 1 are positioned and fixed in the peripheral direction, so that relative rotations of these two are arrested.

C. Coupling bolt means 3

The coupling bolt means 3 for coupling the device main body 1 and shank 2 is mainly composed of, more specifically as shown in FIG. 2, a fitting part 40 provided in the coupling part of the device main body 1 and shank 2, a coupling bolt 21 as coupling tool, a bolt head engaging part 42 provided at the device main body 1 side, and a screw hole 43 provided at the shank 2 side.

The fitting part 40 is composed of a taper shaft 50 and an engaging surface 51 provided on the device main body 1, and a taper hole 52 and an engaging surface 53 provided on the shank 2.

The taper shaft 50 is tapered toward the base end side in the base end portion of the input shaft 6, and on the base end surface of the taper shaft 50, the engaging surface 51 is formed continuously to the taper shaft 50. This engaging surface 51 is formed in a flat plane orthogonal to the axial center of the taper shaft 50. However, it is not always required that the engaging surface 51 and taper shaft 50 be continuous as shown in the drawing.

On the other hand, the taper hole 52 is provided corresponding to the taper shaft 50, in the front end portion of the shank 2, and at the front end surface of the taper hole 52, the engaging surface 53 is provided continuously to the taper hole 52. This engaging surface 53 is also formed on a flat plane orthogonal to the axial center of the taper hole 52, same as the engaging surface 51. The engaging surface 53 and the taper hole 52 may not be always continuously as shown in the drawing, same as in the relation between the engaging surface 51 and taper shaft 50.

By the tightening force of the coupling bolt 41 mentioned below, the taper shaft 50 and taper hole 52, and the engaging surface 51 and engaging surface 53 are fitted closely with each other simultaneously, and the shank 2 and device main body 1 are coupled and fixed in a two-plane restraint state. By the two-plane restraint of the fitting part 40, a high rigidity is obtained in the coupling part, against load in the axial direction and radial direction, or load in any direction. Reference numeral 80 indicates a locking pin planted on the engaging surface 51 of the input shaft 6, and this locking pin 80 is put and fixed in a pin hole 81 of the engaging surface 53 of the shank 2.

The coupling bolt 41 is for tightening and fixing the fitting part 40, and it is designed to be rotated and manipulated from the base end side of the shank 2. Specifically, the head 41a of the coupling bolt 41 is rotatably arrested in the bolt head engaging part 42 of the device main body 1 side, and its threaded part 41b is screwed into the screw hole 43 of the shank 2.

That is, as shown in FIG. 2, at the axial center position of the taper shaft 50 of the input shaft 6, a cylindrical insertion hole (bolt insertion hole) 55 is penetrating in the longitudinal direction coaxially with the taper shaft 50, and the portion of the straight shaft part 41c of the coupling bolt 41 is inserted in this insertion hole 55. In the front end side opening of the insertion hole 55, a cylindrical space (bolt head accommodating space) 56 for rotatably accommodating the head 41a of the coupling bolt 41 is provided, and a boundary step 57 between the cylindrical space 56 and insertion hole 55 is the stopping shoulder (coupling support) part to which the head 41a abuts to stop. The insertion hole 55, cylindrical space 56, and stopping shoulder 57 are combined to compose the bolt head engaging part 42.

On the other hand, at the axial center position of the taper hole 52 of the shank 2, an insertion hole 58 is penetrating in the longitudinal direction coaxially with the taper hole 52. This insertion hole 58 has its front end side part formed in the screw hole 43, and its base end side portion is a screw hole 65 for pull stud bolt. The both screw holes 43, 65 are nearly in the same diameter as the insertion hole 58. The screw hole 65 for pull stud bolt is used for fitting the pull stud bolt when mounting the shank 2 on the main shaft 30 of the machine main body 10. The threaded part 41b of the coupling bolt 41 is screwed in the screw hole 43, and a tool engaging part 59 is recessed in the axial outer end surface or the threaded part end surface of the coupling bolt 41. This tool engaging part 59 is specifically in a shape of a hexagon wrench hole to be engaged with a hexagon wrench (not shown) as the rotary operation tool.

The hexagon wrench key as the rotary operation tool is inserted into the insertion hole 58 from the base end side of the shank 2, and is fitted in the hexagon wrench hole 59, and the coupling bolt 41 is rotated and operated. Accordingly, the coupling bolt 41 is screwed forward and backward in the axial direction in the screw hole 43, and the fitting state of the fitting part 40 is clamped and fixed, or cleared.

D. Negative pressure preventive means 4

The negative pressure preventive means 4 is designed to communicate the inside of the housing 5 with the atmosphere. Specifically, as shown in FIG. 2, the negative pressure preventive means 4 comprises a first communication passage 60 penetrated in the coupling bolt 41, a second communication passage 61 provided in the shank 2, and a third communication passage 62 connecting these two communication passages 60, 61. The first communication passage 60 comprises an axial direction passage 60a and a radial direction passage 60b. The axial direction passage 60a is extended along the axial center of the coupling bolt 41, and opens to the end face of the head 41a, being opposite to the cylindrical space 56. The radial direction passage 60b is extended in the radial direction in the straight shank 41c of the coupling bolt 41, and its one end communicates with the axial direction passage 60a and the other end opens to the outer circumference of the straight shank 41c, thereby communicating with the third communication passage 62.

The third communication passage 62 comprises a gap passage 62a between the insertion hole 55 of the input shaft 6 and the straight shank 41c of the coupling bolt 41, and a radial direction passage 62b extending in the radial direction in the taper shank 50 of the input shaft 6. These passages 62a, 62b respectively communicate with the radial direction passage 60b of the first communication passage 60 and one end of the second communication passage 61.

The second communication passage 61 is extended from the radial direction passage 62b of the third communication passage 62 outward in the radial direction in the flange 31 of the shank 2, and its outer end opens opposite to the bottom 32a of the key groove 32 of the flange 31. A screw hole is provided in the opening 61a of this bottom 32a, and a socket head blind plug 63 is screwed therein.

The inner end of the negative pressure preventive means 4 starts from the cylindrical space 56 of the input shaft 6 and extends through the first communication passage 60 (60a, 60b), third communication passage 62 (62a, 62b), second communication passage 61, and the threaded groove of the socket head blind plug 63, and its outer end is terminated in the bottom 32a of the key groove 32. Accordingly, the inside of the hollow housing 5 of the device main body 1 is always communicating with the atmosphere while keeping liquid tightness.

Relating to the negative pressure preventive means 4, meanwhile, covers 70, 71 having labyrinth seal structure is provided before and after the hollow housing 5, and oil seals 72, 72 . . . , such as O-rings are placed at the junction of each structure, thereby preventing invasion of coolant liquid into the device main body 1 from outside.

In thus constituted speed-increasing spindle, before its mounting, the sliding element 14 of the locking means 11 is moved by an internal spring (not shown), and its detent pawl 14a is engaged with the detent groove 15 of the shank 2. As a result, relative rotation between the shank 2 and the hollow housing 5 of the device main body 1 is fixed.

On the other hand, when the speed-increasing spindle device is mounted on the main shaft 30 of the machine main body 10, the locking pin 12 of the locking means 11 is engaged with the locking block 13 of the machine main body 10. As a result, the hollow housing 5 is supported in a locked state on the machine main body 10, and the sliding element 14 is moved in the opposite direction, resisting the internal spring, by the locking block 13.

Consequently, the detent pawl 14a of the sliding element 14 is departed from the detent groove 15, and the shank 2 and input shaft 6 are allowed to rotate relatively to the hollow housing 5.

In this mounted state, when the main shaft 30 of the machine main body 10 rotates, the input shaft 6 is rotated and driven integrally with the shank 2. The rotation of the input shaft 6 is driven and transmitted to the high speed output shaft 7 after being increased in speed several times by the planetary motion of the traction drive mechanism 8, and therefore the rotary tool mounted on the front end of the high speed output shaft 7 is rotated at high speed together with the high speed output shaft 7.

By this high speed rotation, a pressure drop occurs in the hollow housing 5, in particular, around the traction drive mechanism 8, but since this position is always communicating with the atmosphere through the negative pressure preventive means 4, ultimately, it does not fall in negative pressure state. Accordingly, the coolant liquid existing massively outside the speed-increasing spindle device is not sucked by the negative pressure to invade into the hollow housing 5, and thereby not leading to lubrication trouble or seizure of the bearing and other parts inside the device.

In this case, the outer end 61a of the negative pressure preventive means 4 is opened to the key groove bottom 32a of the shank 2 at the location hardly exposed to coolant liquid splashes, and the drive key 33 plays the role of cover of the outer end 61a. Therefore, in the negative pressure preventive means 4, while its air permeability is maintained, the liquid tightness is assured, and the coolant liquid outside the device hardly invades into the negative pressure preventive means 4.

Moreover, in the negative pressure preventive means 4, the first communication passage 60 communicating with the inside of the device and the second communication passage 61 communicating with the outside of the device are provided in different parts (coupling bolt 41, shank 2). These communication passages 60, 61 are further connected indirectly to the third communication passage 62 provided in other part (input shaft 6), and therefore it the coolant liquid flows into the second communication passage 61 by some factor, its flow is completely arrested at the junction with the third communication passage 62 or first communication passage 60.

Incidentally, the device main body 1 and shank 2 are separable in the axial direction by the coupling bolt means 3, and if either end terminates its life, or when combining the device main body 1 and shank 2 of different types, it is possible to disassemble and reassemble. In such disassembling and reassembling, the job is easy and prompt by inserting a hexagon wrench from the base end side of the shank 2 and rotating and manipulating the coupling bolt 41.

In such coupling bolt means 3, the cylindrical space 56 of the bolt head engaging part 42 does not exist in the shank 2, and hence not limited by the maximum hole diameter permitted in the shank 2 in terms of strength, it is set larger than the maximum hole diameter. Accordingly, the outside diameter of the head 41a of the coupling bolt 41 accommodated in the cylindrical space 56 is not limited by the maximum hole diameter of the shank 2.

As a result, the shaft diameter of the coupling bolt 41 can be at least set as large as the maximum hole diameter of the shank 2 (in the illustrated example, the inside diameter of the screw hole 65 for pull stud bolt of the shank 2), and hence the rigidity and strength of the coupling part by the coupling bolt 41 can be enhanced.

Still more, coupling of the input shaft 6 and shank 2 of the device main body 1 is realized by two-plane restraint structure by the fitting part 40, and by the synergistic effect with the high rigidity of the coupling bolt 41, the rigidity and strength of the coupling part are further enhanced.

In addition, as for the insertion hole 58 of the shank 2, since it is not necessary to consider the outside diameter of the head 41a of the coupling bolt 41, its hole diameter is enough as far as it has a dimension at least necessary for insertion of the rotary operation tool, and it is advantageous from the viewpoint of keeping of strength of the shank 2. Moreover, when this hole diameter is a minimum limit hole necessary for insertion of the rotary operation tool, it can function also as the positioning guide of the rotary operation tool, and hence engaging job of the rotary operation tool on the tool engaging part 59 of the coupling bolt 41 is easy and secure.

Embodiment 2

Figure 3:
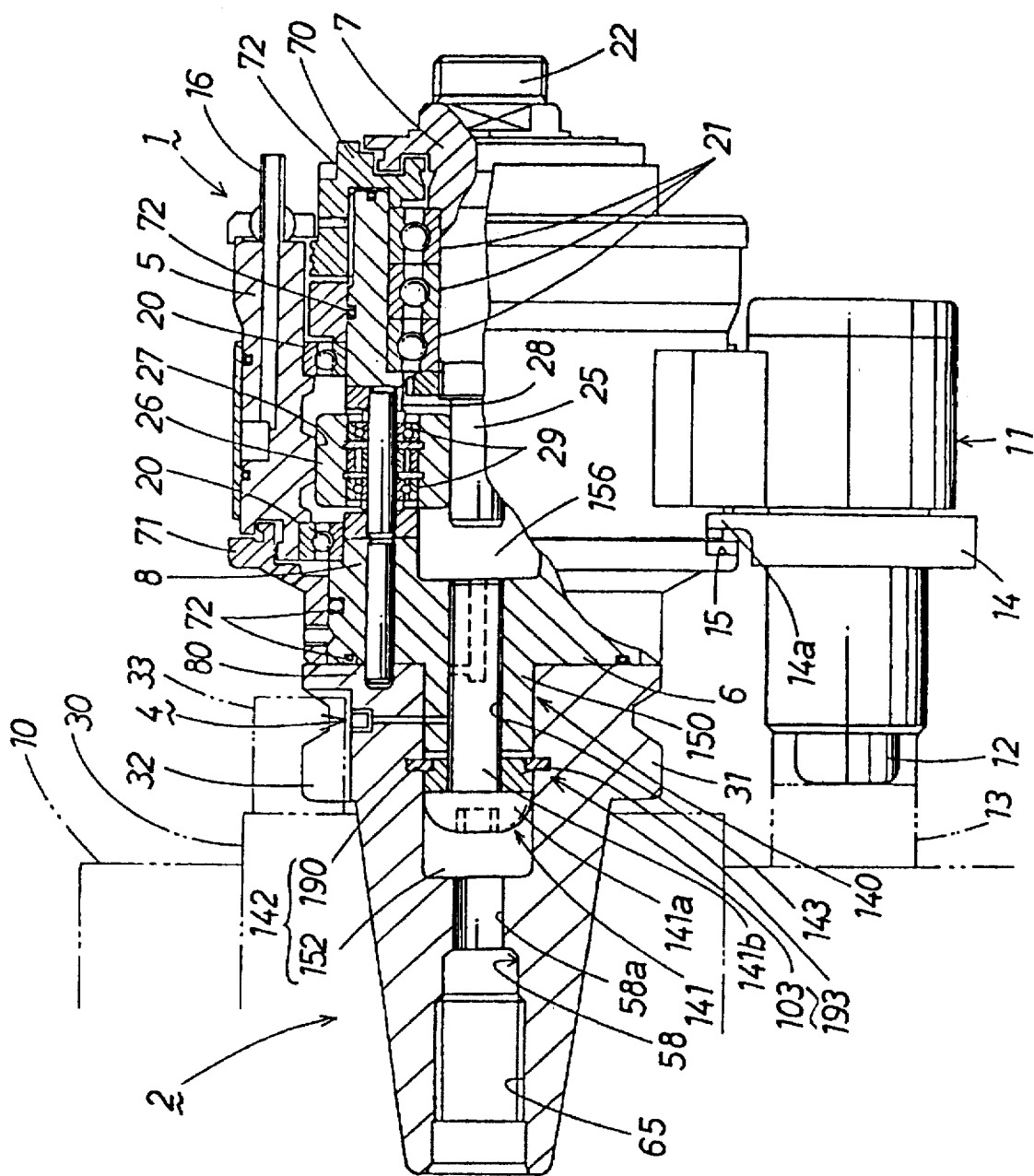
FIG. 3 is a partially cut-away side view of a speed-increasing spindle device in embodiment 2 of the invention.
Figure 4:
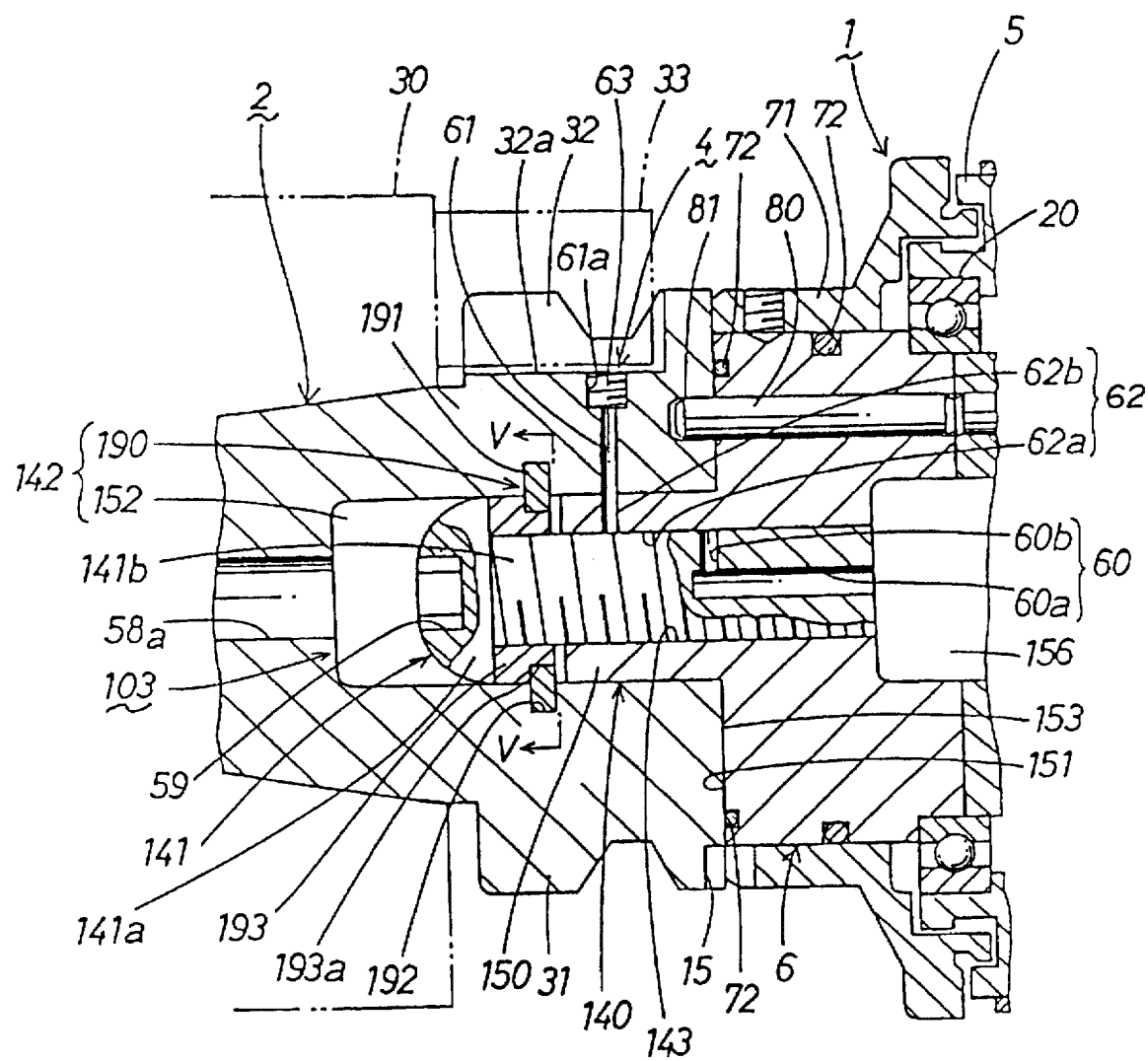
FIG. 4 is a side sectional view showing an assembly structure of device main body and shank for composing essential parts of the speed-increasing spindle device.
Figure 5A:
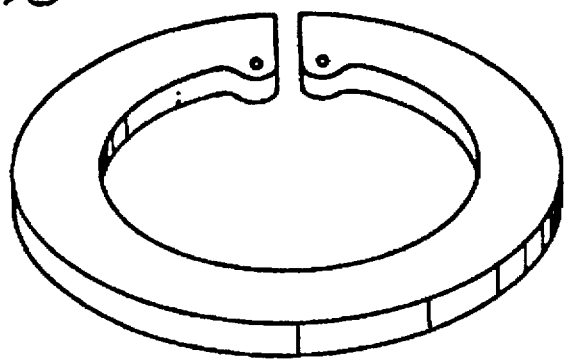
FIG. 5(a) is an enlarged perspective view showing a stopper ring.
Figure 5B:
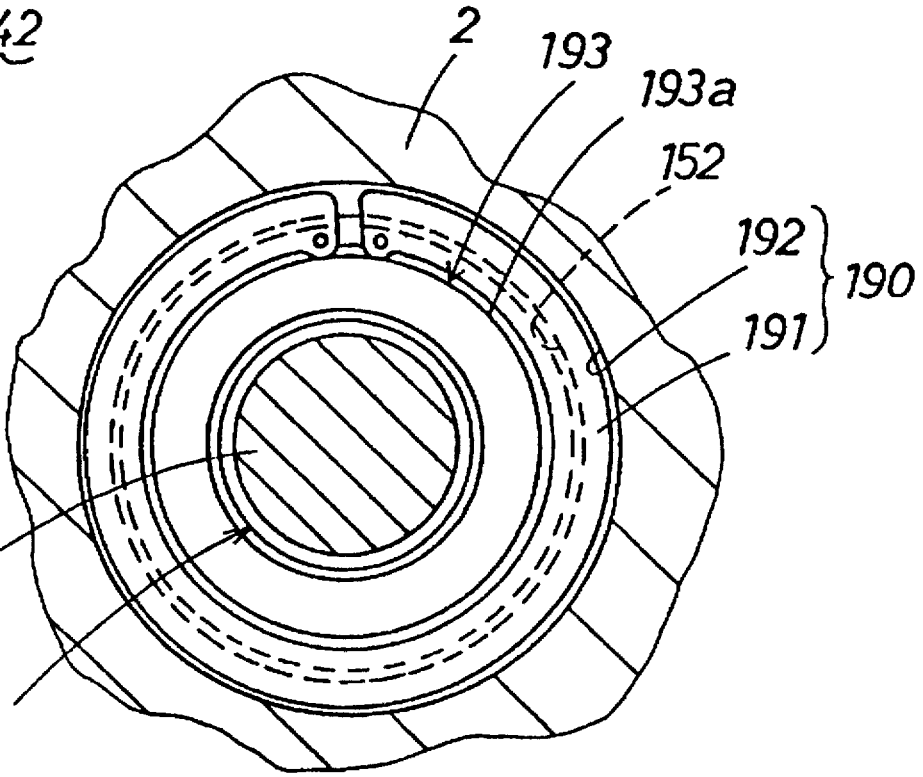
FIG. 5(b) is an enlarged sectional view of a bolt head engaging part along line V—V in FIG. 4.

This embodiment is shown in FIG. 3 to FIG. 5, in which the basic structure of coupling bolt means 103 for coupling the device main body 1 and shank 2 is in reverse structure to the coupling bolt means 3 in embodiment 1.

That is, the coupling bolt means 103 of the embodiment has a coupling bolt 141 disposed in reverse direction back and forth as compared with the case of embodiment 1. By contrast, the bolt head engaging part 142 engaged in the axial direction with the head 141a of the coupling bolt 141 is provided at the shank 2 side, and the screw hole 143 in which the coupling bolt 141 is fitted is provided at the device main body 1 side. The constitution is specifically described below.

A specific constitution of the coupling bolt 103 is shown in FIG. 4. This coupling bolt means 103 is mainly composed of a fitting part 140 provided at the linkage part of the device main body 1 and shank 2, in addition to the coupling bolt 141, bolt head engaging part 142 and screw hole 143.

The fitting part 140 comprises a linkage shaft 150 and an engaging plane 151 provided in the device main body 1, and a cylindrical space 152 and an engaging plane 153 provided in the shank 2.

The linkage shaft 150 is formed in a columnar form toward the base end side in the base end portion of the input shaft 6, and the engaging plane 151 is formed continuously to the linkage shaft 150 at the base end side of the linkage shaft 150. The engaging plane 151 is formed in a flat plane orthogonal to the axial center of the linkage shaft 150. It is, however, not always necessary to form the engaging plane 151 and linkage shaft 150 continuously as shown in the drawing.

On the other hand, the cylindrical space 152 is provided corresponding to the linkage shaft 150 in the front end portion of the shank 2, and the engaging plane 153 is formed continuously to the cylindrical space 152 at the front end side of the cylindrical space 152. This engaging plane 153 is, same as the engaging plane 151, formed in a flat plane orthogonal to the axial center of the cylindrical space 152. The engaging plane 153 and cylindrical space 152 are not always necessary to be continuos as shown, same as the engaging plane 151 and linkage shaft 150. As described later, incidentally, the cylindrical space 152 forms the bolt head accommodating space of the bolt head engaging part 142.

The outside diameter of the linkage shaft 150 and the inside diameter of the cylindrical shaft 152 are set nearly in the same size. The length of the linkage shaft 150 is set so that the front end of the linkage shaft 150 may not mutually interfere with a coupling support 190 of the bolt head engaging part 142 described below when the both engaging planes 151, 153 are in mutually abutting state.

The linkage shaft 150 is inserted and supported in the cylindrical space 152, the device main body 1 and shank 2 are positioned coaxially, the engaging plane 151 and engaging plane 153 are mutually engaged tightly by the tightening force of the coupling bolt 141 mentioned below, and the shank 2 and device main body 1 are coupled and fixed.

The coupling bolt 151 is to tighten and fix the engaging part 140, and can be rotated and operated from the base end side of the shank 2. More specifically, the head 141a of the coupling bolt 141 is rotatably engaged with the bolt head engaging part 142 provided at the front end of the shank 2, and its threaded part 141b is screwed into a screw hole 143 of the device main body 1. At the end face of the head 141a of the coupling bolt 141, an engaging part 59 for rotary operation tool same as in embodiment 1 is recessed, and the coupling bolt 141 can be rotated and operated through an insertion hole 58 from the base end side of the shank 2. In this embodiment, as the coupling bolt 141, a commercial general-purpose hexagon socket head bolt (for example, JIS conforming product) may be preferably used.

The bolt head engaging part 142 comprises the cylindrical space 152 as the bolt head accommodating space, and a coupling support 190 provided in this cylindrical space 152, as shown in FIG. 4 and FIG. 5.

The cylindrical space 152 is provided continuously to the front end side of the insertion hole 58 of the shank 2, and opens to the front end side of the shank 2. The inside diameter of the cylindrical space 152 is set large enough to accommodate rotatably the head 141a of the coupling bolt 141, and same as in embodiment 1, set larger than the maximum hole diameter permitted in the shank 2 in terms of strength.

More specifically, the inside diameter of the cylindrical space 152 is set larger than the screw hole 65 for pull stud bolt provided in the base end portion of the shank 2. Accordingly, the cylindrical space 152 is designed to accommodate rotatably the coupling bolt 141 having the head 141a of a larger diameter than the screw hole 65. In this relation, the length of the cylindrical space 152 is set in a range so that the wall thickness at the position of the shank 2 comprising the cylindrical space 152 may be enough for holding strength, in consideration of the relative relation of its inside diameter with the outside diameter of the shank 2.

The coupling support 190 is to engage and support the head 141a of the coupling bolt 141 in the axial direction, and more specifically an annular detent member 191 is fitted in an annular fitting groove 192 provided in the cylindrical space 152.

The detent member 191 is in a form of stopper ring or snap ring that can be elastically deformed in the radial direction. The shape and dimension of the stopper ring 191 (inside and outside diameter, thickness, etc.) are defined so as to bear the tightening force by the coupling bolt 141, as being engaged with the head 141a of the coupling bolt 141 in the axial direction, and to function as stopper of the coupling bolt 141. In this embodiment, a commercial general-purpose snap ring (for example, JIS conforming product) is used as the detent member 191 (see FIG. 5(a)).

The fitting groove 192 is provided at a specific position in the axial direction inside the cylindrical space 152, that is, at a position capable of keeping the space for accommodating the head 141a of the coupling bolt 141 by the stopper ring 191 fitted therein, and not causing mutual interference of the stopper ring 191 and the linkage shaft 150 of the input shaft 6. The shape and dimensions of the fitting groove 192 (depth, width, etc.) are set so as to hold the stopper ring 191 perpendicularly to the axial center of the cylindrical space 152, so that the both functions of the stopper ring 191 may be exhibited effectively.

In this relation, moreover, a washer 193 interposed between the head 141a of the coupling bolt 141 and the stopper ring 191 has a thickness enough for moving without tilting along the inner surface of the cylindrical space 152 as shown in the drawing, and there is also a detent shoulder 193a for inserting and engaging in the inside of the stopper ring 191. Accordingly, stable holding of the head 141a when releasing of coupling by the coupling bolt 141, and coupling action when coupling by the coupling bolt 141 may be done smoothly and securely.

When setting the coupling bolt 141, in the first place, the head 141a of the coupling bolt 141 is inserted together with the washer 193 into the cylindrical space 142 of the shank 2 from the front end side opening, and the stopper ring 191 is elastically fitted to the fitting groove 192 while elastically deforming the stopper ring 191 in the diameter contracting direction by proper means.

In thus constituted coupling bolt means 103, same as in embodiment 1, by using a hexagon wrench as the rotary operation tool, by rotating and operating the coupling bolt 141 of the coupling bolt means 103 from the base end side of the shank 2, the device main body 1 and shank 2 may be assembled and disassembled easily and promptly.

That is, by inserting the hexagon wrench into the insertion hole 58 from the base end side of the shank 2, it is fitted into the tool hole 59, and the coupling bolt 141 is rotated and operated. Consequently, the threaded part 141b of the coupling bolt 141 is screwed forward and backward in the axial direction in the screw hole 143, and the engagement state of the fitting part is tightly fixed or released.

In this relation, in part of the insertion hole 58, there is a small cylindrical positioning guide 58a corresponding to the outside diameter of the rotary operation tool or the hexagon wrench, and hence the hexagon wrench can be easily and securely fitted into the engaging part 59 of the coupling bolt 141.

The basic structure of the negative pressure preventive means 4 is nearly same as in embodiment 1, but is slightly modified corresponding to the constitution of the coupling bolt means 103. That is, the axial direction passage 60a of the first communication passage 60 extends along the axial line of the threaded part 141b of the coupling bolt 141, and opens to its end face, confronting the cylindrical space 156 of the input shaft 150. The radial direction passage 60b communicating with the axial direction passage 60a opens to the outer circumference of the threaded part 141b of the coupling bolt 141, and communicates with the third passage 62. The third passage 62 comprises a gap passage 62a formed in a spiral passage between the screw hole 143 and threaded part 141b of the coupling bolt 141, and a radial direction passage 62b extended in the radial direction in the linkage shaft 150 of the input shaft 6.

In the coupling bolt means 103 of the embodiment, the cylindrical space 152 of the bolt head engaging part 142 is provided at the front end side or the large end side of the shank 2 in a range for keeping the wall thickness of the shank 2 enough to maintain the strength. Accordingly, same as in embodiment 1, this cylindrical space 152 is set larger than the maximum hole diameter permitted in the shank 2 in terms of strength, and the outside diameter of the head 141a of the coupling bolt 141 accommodated in the cylindrical space 152 is not limited by the maximum hole diameter of the shank 2.

As a result, the shaft diameter of the coupling bolt 141 can be set as large as, at least, the maximum hole diameter of the shank 2 (in the illustrated example, the inside diameter of the screw hole 65 for pull stud bolt of the shank 2, same as in embodiment 1), and hence the rigidity and strength of the coupling part by the coupling bolt 141 can be enhanced.

Moreover, as the coupling bolt 141, typical bolts such as hexagon socket head bolts specified in JIS or the like can be used, and the device cost can be reduced.

The other structures and actions are same as in embodiment 1.

Embodiment 3

Figure 6:
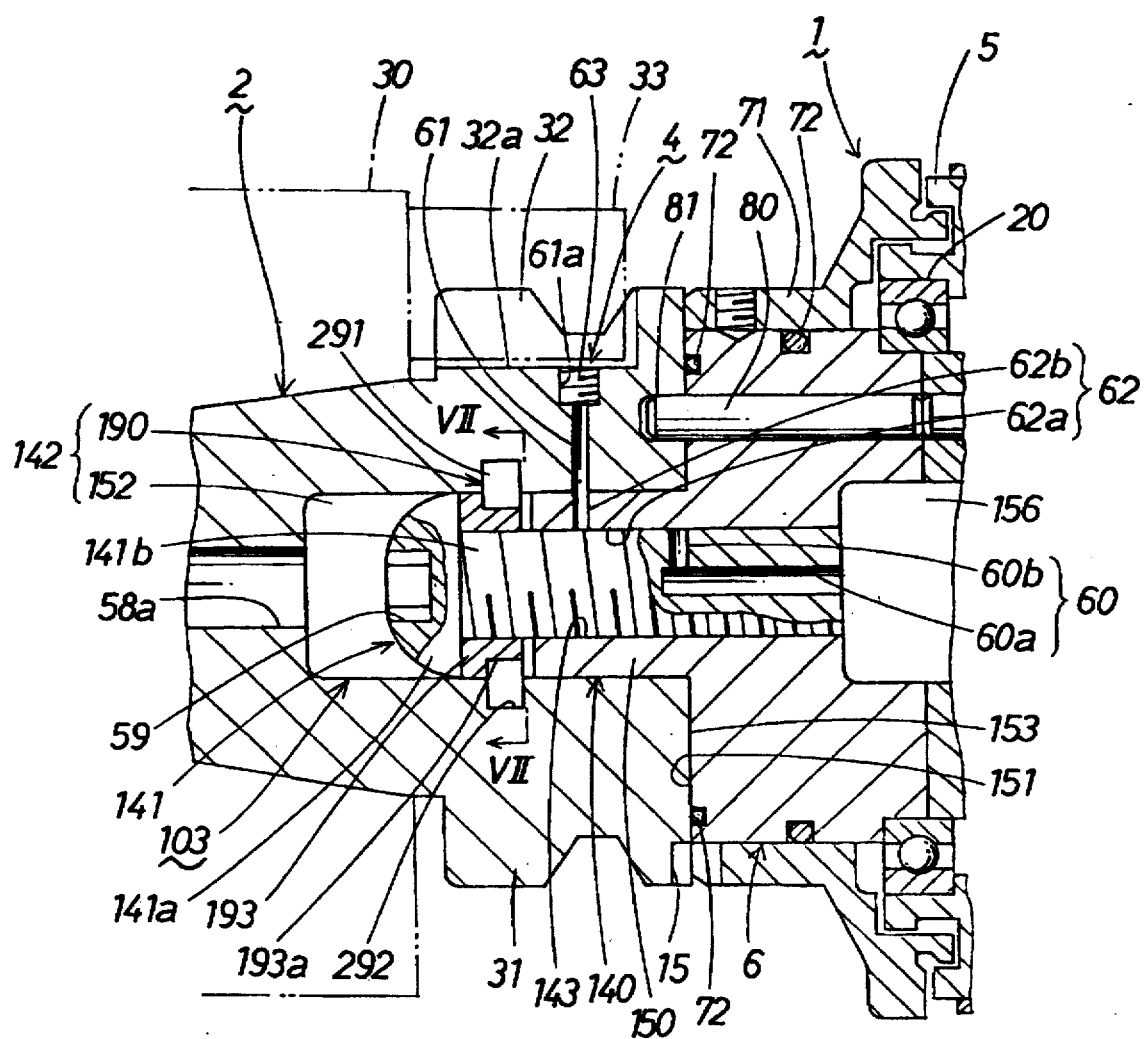
FIG. 6 is a side sectional view showing an assembly structure of device main body and shank for composing essential parts of a speed-increasing spindle device in embodiment 3 of the invention.
Figure 7A:
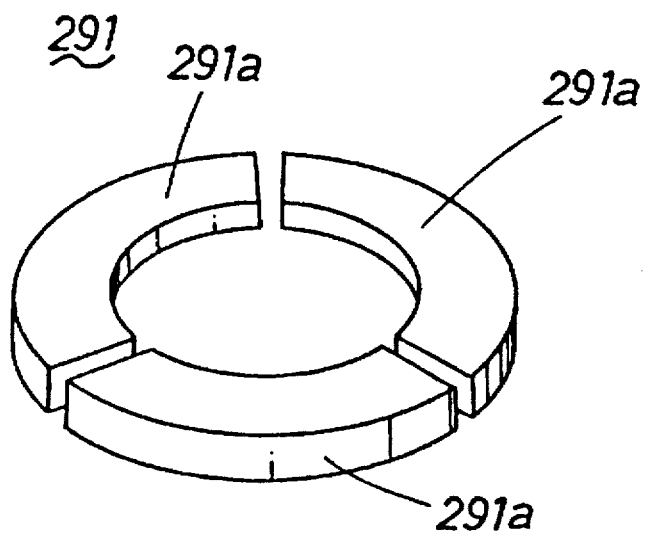
FIG. 7(a) is an enlarged perspective view showing a ring member.
Figure 7B:
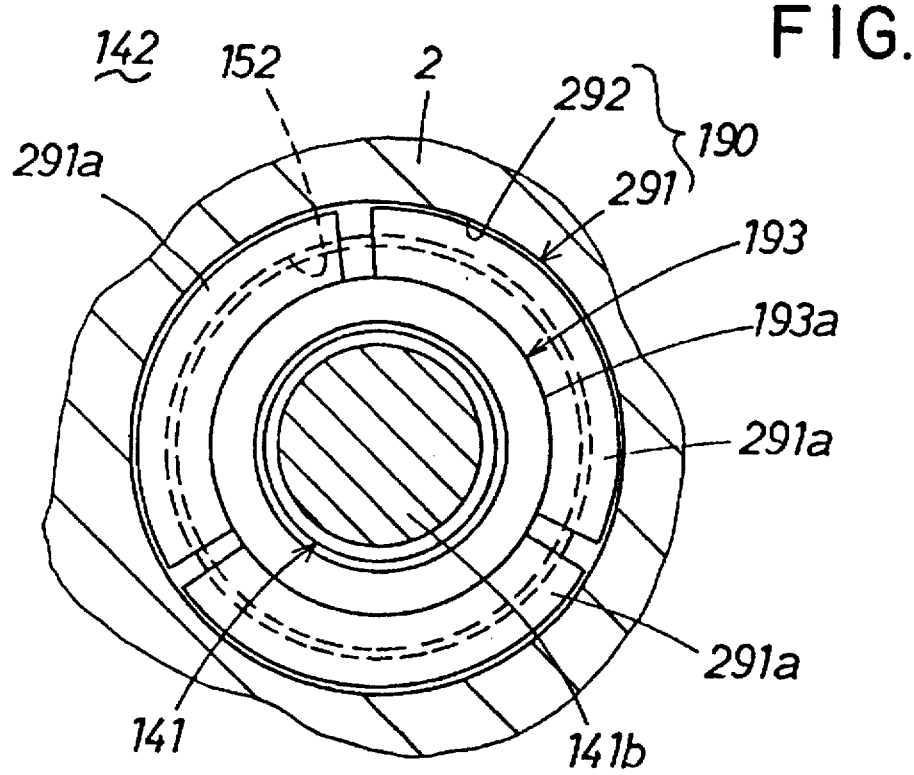
FIG. 7(b) is an enlarged sectional view of a bolt head engaging part along line VII—VII in FIG. 6.
Figure 8:
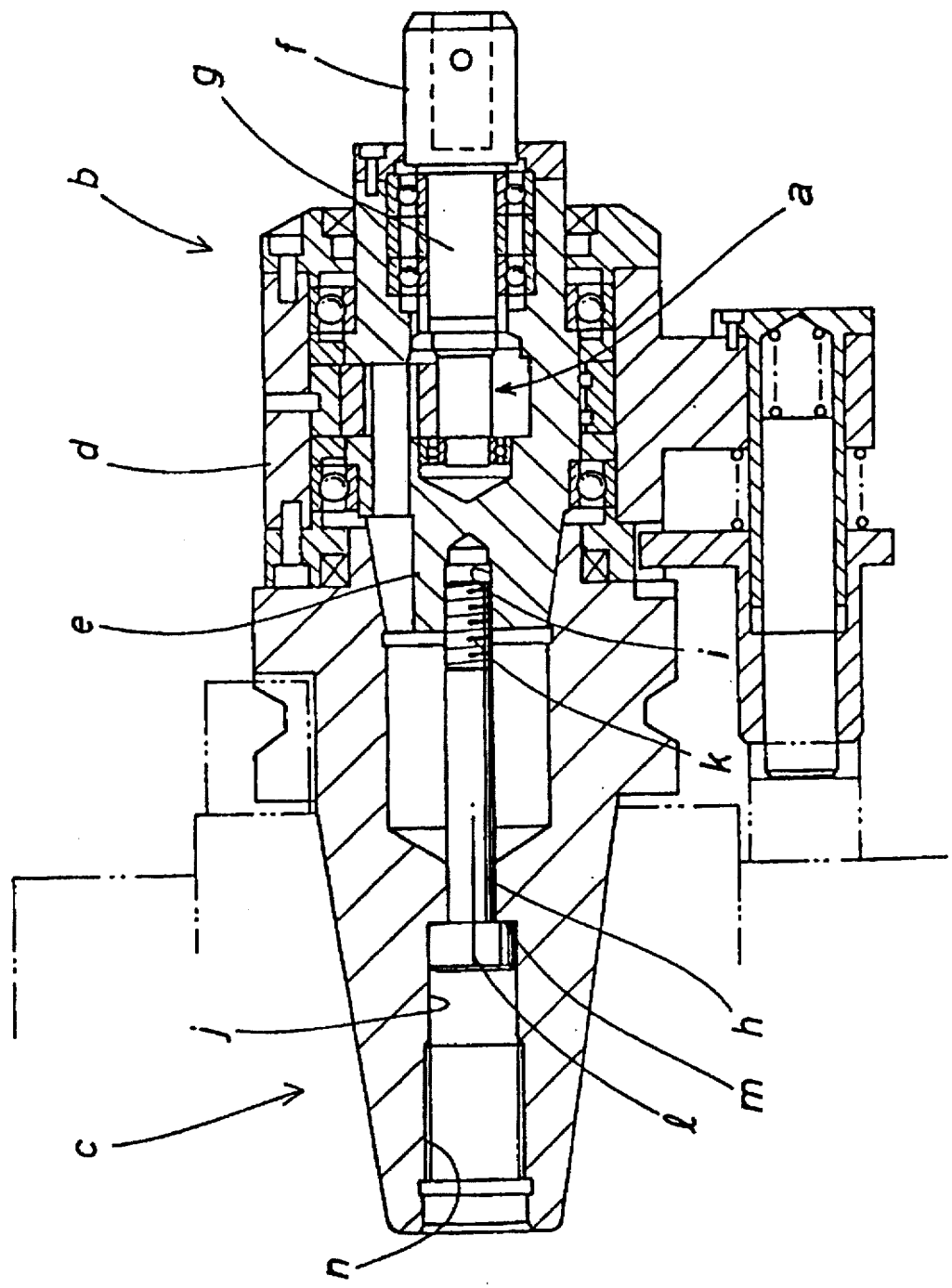
FIG. 8 is a side sectional view showing a conventional speed-increasing spindle device.

This embodiment is shown in FIG. 6 and FIG. 7, in which the constitution is suited in the case where greater in the tightening force by the coupling bolt 141, and greater rigidity and strength are required in the coupling support part.

That is, in this embodiment, a ring member 291 of split structure is used as detent member for engaging and supporting the head 141a of the coupling bolt 141. This ring member 291 is composed of a plurality of arcuate members 291a, 291a . . . divided uniformly in the circumferential direction. The specific constitution of the ring member 291, such as the number of divisions, may be properly set in relation to the magnitude of the tightening force by the coupling bolt 141 and peripheral structures, and in the shown example the ring is divided into three parts, consisting of three arcuate members 291a, 291a, 291a.

In such split structure, fitting of the ring member 291 in a fitting groove 292 of the cylindrical space 152 is easy, and the ring member 291, that is, each arcuate member 291a can be set in a large outside diameter and a large thickness, as compared with the stopper ring 191 of embodiment 2 making use of elastic deformation, as shown in FIG. 6 and FIG. 7(a). Hence, the fitting groove 292 is also set in a large depth corresponding to the outside diameter of the arcuate member 291a, and in a width for fitting and fixing the outer peripheral edge of the arcuate member 291a.

In this ring member 291, therefore, the large tightening force by the coupling bolt 141 can be securely borne, and a sufficient rigidity and strength may be assured in the coupling area.

The other structures and actions are same as in embodiment 2.

The foregoing embodiments 1 to 3 are intended to present preferred examples of the invention, and the invention is not limited to these examples alone, but the design may be changed and modified variously within its scope.

For example, the specific structure of the coupling bolt means 3, 103 is not limited to illustrated embodiments, but the design may be changed as far as the specified actions and effects are assured.

Or, the fitting part 40 of embodiment 1 may be used instead of the fitting part 140 of embodiment 2 or 3, or, vice versa, the fitting part 140 of embodiment 2 or 3 may be used instead of the fitting part 40 of embodiment 1.

Likewise, the specific structure of the negative pressure preventive means 4 is not limited to the shown example alone. For instance, the route and number of communication passages 60, 61, 62 may be modified depending on the structure of the object device and purpose.

In the shown embodiments, as the planet speed-increasing mechanism, the traction drive mechanism 8 excellent in reduction of noise and vibration in operation is used, but not limited to this, the planet gear speed-increasing mechanism using gear transmission may be also employed. In this case, although not specifically illustrated, the sun gear is provided instead of the sun roller, the planet gear instead of the planet roller, and the inner tooth gear instead of the annular static track.

In the invention, as specifically described herein, since the bolt head engaging part engaged with the head of the coupling bolt in the axial direction has a bolt head accommodating space larger than the maximum hole diameter permitted in the shank in terms of strength, the head outside diameter of the coupling bolt is not limited by the maximum hole diameter of the shank, and may be set, for example, larger than the inside diameter of the screw hole for the pull stud bolt provided in the base end portion of the shank. As a result, the shaft diameter of the coupling bolt may be set as large as the maximum hole diameter permitted, for example, in the shank in terms of strength, so that the rigidity and strength of the coupling part by the coupling bolt may be enhanced.

As a reflective effect, the insertion hole diameter penetrating in the shank may only enough for allowing insertion of at least the rotary operation tool because it is not necessary to consider the outside diameter of the head of the coupling bolt, and it is advantageous also from the viewpoint of keeping of strength of the shank. Still more, when a positioning guide is provided at least in part of the insertion hole in a minimum diameter for insertion of rotary operation tool, the engaging job of the rotary operation tool in the engaging part of the coupling bolt is easy and secure.

Besides, when the coupling of the base end portion of the input shaft of the device main body and the front end portion of the shank is a two-plane restraint structure consisting of a taper plane and a continuous engaging plane, the rigidity and strength of the coupling part may be further increased by the synergistic effect with the high rigidity of the coupling bolt.

Furthermore, by providing with a negative pressure preventive structure for communicating the inside of the device main body with the atmosphere, the device main body does not fall in negative pressure state if the speed-increasing spindle device is rotated and driven at high speed, and external coolant liquid is not sucked in. In this case, by installing indirect connection structures of different constituent members on the way of the communication passages, invasion of coolant liquid may be prevented securely.

As the invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A speed-increasing spindle device comprising:
a device main body incorporating a planet speed increasing mechanism;
a shank detachably mounted on a main shaft of a machine tool; and
a coupling bolt means for assembling and coupling the device main body and the shank separably in the axial direction; wherein
the coupling bolt means comprises a coupling bolt, a bolt head engaging part provided at one side of the device main body, with the head of the coupling bolt engaged in the axial direction, and a screw hole provided at the other side of the device main body, in which the coupling bolt is screwed and engaged; and, further, wherein
the bolt head engaging part possesses a bolt head accommodating space larger than the maximum hole diameter permitted in the shank in terms of strength, and
the coupling bolt has an engaging part for a rotary operation tool at its outer end in the axial direction, whereby access to said engaging part is provided through an insertion hole in the shank; and wherein
the coupling bolt has its head rotatably engaged with the bolt head engaging part provided in the base end portion of the input shaft of the device main body, and its threaded part is screwed and fitted into the screw hole provided along the axial center of the shank, and the engaging part for the rotary operation tool is provided in the screw part end surface of the coupling bolt; and wherein
the bolt head engaging part comprises a bolt insertion hole communicating with the base end side of the input shaft from the accommodating space, and a coupling support part for engaging and supporting the head of the coupling bolt in the axial direction, being provided in a boundary area of the accommodating space and insertion hole.

2. A speed-increasing spindle device comprising:
a device main body incorporating a planet speed increasing mechanism; a shank detachably mounted on a main shaft of a machine tool; and
a coupling bolt means for assembling and coupling the device main body and the shank separably in the axial direction; wherein
the coupling bolt means comprises a coupling bolt, a bolt head engaging part provided at one side of the device main body, with the head of the coupling bolt engaged in the axial direction, and a screw hole provided at the other side of the device main body, in which the coupling bolt is screwed and engaged, and the bolt head engaging part possesses a bolt head accommodating space larger than the maximum hole diameter permitted in the shank in terms of strength, and the coupling bolt has an engaging part for a rotary operation tool at its outer end in the axial direction, whereby access to said engaging part is provided through an insertion hole in the shank; and wherein
the coupling bolt has its head rotatably engaged with the bolt head engaging part provided in the front end portion of the shank, and its threaded portion is screwed into the screw hole provided along the axial center of the device main body;
the engaging part for the rotary operation tool is provided in the head end surface of the coupling bolt;
the bolt head engaging part comprises a bolt head accommodating space opening to the front end side of the shank having a diameter larger than the insertion hole of the shank; and
a coupling support part for engaging and supporting the head of the coupling bolt in the axial direction, said coupling support part being provided in the accommodating space; wherein the bolt head accommodating space of the shank is a cylindrical space larger in diameter than the insertion hole of the shank;

the coupling support part has an annular detent member fitted in the cylindrical space, and the shape and dimensions of the detent member are defined so as to bear the tightening force by the coupling bolt, as being engaged with the head of the coupling bolt in the axial direction, and work as a locking piece of the coupling bolt, and the detent member of the coupling support part is in the form of a stopper ring deforming elastically in the radial direction, and the stopper ring is elastically fitted in an annular fitting groove provided in the cylindrical space.

3. A speed-increasing spindle device comprising:

a device main body incorporating a planet speed increasing mechanism; a shank detachably mounted on a main shaft of a machine tool; and a coupling bolt means for assembling and coupling the device main body and the shank separably in the axial direction; wherein the coupling bolt means comprises a coupling bolt, a bolt head engaging part provided at one side of the device main body, with the head of the coupling bolt engaged in the axial direction, and a screw hole provided at the other side of the device main body, in which the coupling bolt is screwed and engaged, and the bolt head engaging part possesses a bolt head accommodating space larger than the maximum hole diameter permitted in the shank in terms of strength, and the coupling bolt has an engaging part for a rotary operation tool at its outer end in the axial direction, whereby access to said engaging part is provided through an insertion hole in the shank; and wherein the coupling bolt has its head rotatably engaged with the bolt head engaging part provided in the front end portion of the shank, and its threaded portion is screwed into the screw hole provided along the axial center of the device main body;

the engaging part for the rotary operation tool is provided in the head end surface of the coupling bolt;

the bolt head engaging part comprises a bolt head accommodating space opening to the front end side of the shank having a diameter larger than the insertion hole of the shank; and a coupling support part for engaging and supporting the head of the coupling bolt in the axial direction, said coupling support part being provided in the accommodating space; wherein the bolt head accommodating space of the shank is a cylindrical space larger in diameter than the insertion hole of the shank;

the coupling support part has an annular detent member fitted in the cylindrical space, and the shape and dimensions of the detent member are defined so as to bear the tightening force by the coupling bolt, as being engaged with the head of the coupling bolt in the axial direction, and work as a locking piece of the coupling bolt, and the detent member of the coupling support part is in the form of a ring member of split structure divided uniformly in a peripheral direction, and this ring member is fitted and fixed in an annular fitting groove provided in the cylindrical space.

4. A speed-increasing spindle device of claim 1, wherein the bolt head accommodating space opens to the front end side in the base end portion of the input shaft, forming a cylindrical space larger in diameter than the insertion hole of the shank, the bolt insertion hole is a cylindrical hole smaller in diameter than the cylindrical space, being coaxial with this cylindrical space, and the coupling support part is provided in the boundary step of the cylindrical space and cylindrical hole, in a form of detent shoulder for abutting and engaging the head of the coupling bolt.

5. A speed-increasing spindle device of claim 1, wherein the shank has the insertion hole penetrating in the longitudinal direction at the axial center position, and the insertion hole has its front end side portion formed as the screw hole to be screwed and engaged with the threaded part of the coupling bolt, and its base end side portion is a screw hole for pull stud bolt, and these two screw holes are nearly in the same diameter as the insertion hole.

6. A speed-increasing spindle device of claim 1, wherein a taper shaft is provided in the base end portion of the input shaft, coaxially with the insertion hole of the coupling bolt, and an engaging plane is provided in the base end plane of the taper shank, a taper hole to be fitted with the taper shaft is provided in the front end portion of the shank, coaxially with the screw hole, and an engaging plane to be combined and engaged with the engaging plane of the input shaft is provided in the opening end plane of the taper hole, and the taper shaft and engaging plane, and the taper hole of the shank and the engaging plane are combined and fitted simultaneously, respectively by the tightening force of the coupling bolt, and the shank and the device main body are tightened and fixed in two-plane restraint state.

7. A speed-increasing spindle device of claim 2 or 3, wherein the shank has the insertion hole penetrating in the longitudinal direction at its axial center position, the front end side portion of the insertion hole is the cylindrical space, and its base end side portion is a screw hole for pull stud bolt, and the inside diameter of the cylindrical space is set larger than the inside diameter of the screw hole for pull stud bolt.

8. A speed-increasing spindle device of claim 2 or 3, wherein the length of the cylindrical space is determined in a range so that the wall thickness of the position of the shank existing in the cylindrical space is enough for assuring a sufficient strength.

9. A speed-increasing spindle device of claim 2 or 3, wherein a washer is interposed between the head of the coupling bolt and the detent member, and the washer has a sufficient thickness for moving without tilting along the inner side of the cylindrical space, and also has a detent shoulder for inserting and engaging in the inner part of the stopper ring.

10. A speed-increasing spindle device of claim 2 or 3, wherein a columnar linkage shaft to be inserted coaxially into the cylindrical space of the shank is provided in the base end portion of the input shaft of the device main body, and a screw hole for the coupling bolt is provided along its axial center, and engaging planes which abut and engage with each other are provided in the opening end face of the cylindrical space and the base end face of the linkage shaft.

11. A speed-increasing spindle device of claim 10, wherein the axial direction position of the coupling support part and the length of the linkage shaft of the input shaft are set so as not to interfere with each other.

12. A speed-increasing spindle device of any of claims 1 to 3, further comprising:

negative pressure preventive means for communicating the inside of the housing with the atmosphere, wherein the negative pressure preventive means comprises a first communication passage provided in the coupling bolt, and a second communication passage provided in the shank, the second communication passage has one end communicating with the first communication passage, and the other end communicating with the outer circumference of the shank, and the outer circumferential position of the shank opened the other end of the second communication passage is the bottom of key groove, which is recessed in the outer circumference of the shank and fitted with a drive key of the main shaft of a machine tool.

13. A speed-increasing spindle device of claim 12, wherein a screw hole is provided in the opening at the other end of the second communication passage in the bottom of the key groove, and a blind plug is screwed therein.

14. A speed-increasing spindle device of claim 12, wherein the first communication passage and second communication passage are indirectly connected through a third communication passage provided in the input shaft.

15. A speed-increasing spindle device of any of claims 1 to 3, wherein the insertion hole of the shank has a positioning guide for positioning and guiding the insertion of the rotary operation tool at least in part thereof.

16. A speed-increasing spindle device of any of claims 1 to 3, wherein the engaging part for the rotary operation tool of the coupling bolt is in a form of a hole for hexagon wrench recessed in the outer end face in the axial direction of the coupling bolt.

* * * * *

UNITED STATES PATENT AND TRADEMARK OFFICE
CERTIFICATE OF CORRECTION

PATENT NO. : 5,700,115

DATED : December 23, 1997

INVENTOR(S) : Chikamori et al.

It is certified that error appears in the above-identified patent and that said Letters Patent is hereby corrected as shown below:

On title page,
Item [30], line 2, please delete "8-024969" insert therefor
-- 8-024669 --.

Signed and Sealed this

Twenty-fourth Day of February, 1998

*Attest:*

BRUCE LEHMAN

*Attesting Officer*    Commissioner of Patents and Trademarks